(12) United States Patent
Kim

(10) Patent No.: US 10,509,385 B2
(45) Date of Patent: Dec. 17, 2019

(54) METHOD OF CONTROLLING ENCODER PRINCIPLE AXIS SPEED SYNCHRONIZATION

(71) Applicant: LSIS CO., LTD., Gyeonggi-do (KR)

(72) Inventor: Seok-Yeon Kim, Gyeonggi-do (KR)

(73) Assignee: LSIS CO., LTD., Anyang-si, Gyeonggi-Do (KR)

( * ) Notice: Subject to any disclaimer, the term of this patent is extended or adjusted under 35 U.S.C. 154(b) by 310 days.

(21) Appl. No.: 15/224,322

(22) Filed: Jul. 29, 2016

(65) Prior Publication Data

US 2017/0038755 A1   Feb. 9, 2017

(30) Foreign Application Priority Data

Aug. 3, 2015 (KR) .................. 10-2015-0109511

(51) Int. Cl.
*G05B 19/05* (2006.01)
*G05B 19/42* (2006.01)
(Continued)

(52) U.S. Cl.
CPC ....... *G05B 19/056* (2013.01); *G05B 19/0426* (2013.01); *G05B 19/058* (2013.01)

(58) Field of Classification Search
CPC .... G05B 19/056; G05B 19/23; G05B 19/058; G05B 19/0426; G05B 2219/37139; G05B 2219/25053; G05B 2219/33083
(Continued)

(56) References Cited

U.S. PATENT DOCUMENTS

2007/0069925 A1* 3/2007 Masaki .................... G01D 5/00
                                                                341/50
2008/0247735 A1* 10/2008 Kazanzides ............... H02P 6/17
                                                                388/815
(Continued)

FOREIGN PATENT DOCUMENTS

CN    1963529 A    5/2007
CN    1979097 A    6/2007
(Continued)

OTHER PUBLICATIONS

Chinese Office Action for related Chinese Application No. 201610609690.X; action dated May 21, 2018; (6 pages).
(Continued)

*Primary Examiner* — Thomas C Lee
*Assistant Examiner* — Anzuman Sharmin
(74) *Attorney, Agent, or Firm* — K&L Gates LLP

(57) ABSTRACT

Disclosed embodiments include methods of controlling an encoder principle axis speed synchronization for controlling a motor, which may be executed by a microprocessor. In some embodiments, the microprocessor includes latching a count value to a specific memory at an input time of an encoder pulse signal when a control period is commenced and the encoder pulse signal is received, generating an output pulse using the count value latched to the specific memory, and mapping the output pulse to an output during a next control period. In some embodiments, an interval between encoder pulse signals is calculated using a count value at an input time of the encoder pulse signal and an encoder input speed is measured according to the interval therebetween so that an encoder speed may be exactly measured.

5 Claims, 9 Drawing Sheets

- Prior art -

(51) Int. Cl.
  *G05B 19/23* (2006.01)
  *G01D 18/00* (2006.01)
  *G05B 19/042* (2006.01)
(58) Field of Classification Search
  USPC .......................................................... 700/275
  See application file for complete search history.

(56) References Cited

U.S. PATENT DOCUMENTS

| | | | |
|---|---|---|---|
| 2008/0252240 | A1 | 10/2008 | Sugie |
| 2009/0256615 | A1* | 10/2009 | Suzuki .................. B41J 11/008 327/298 |
| 2010/0188103 | A1* | 7/2010 | Takai ..................... G05B 21/02 324/613 |
| 2013/0241570 | A1* | 9/2013 | Okamoto ........... G01R 31/2841 324/537 |

FOREIGN PATENT DOCUMENTS

| | | |
|---|---|---|
| CN | 101004425 A | 7/2007 |
| CN | 101226408 A | 7/2008 |
| CN | 101718516 A | 6/2010 |
| CN | 102200541 A | 9/2011 |
| CN | 104133407 A | 11/2014 |
| JP | S57151859 A | 9/1982 |
| JP | 2000180210 A | 6/2000 |
| JP | 2006029996 A | 2/2006 |
| JP | 2010271054 A | 12/2010 |
| JP | 2011180073 A | 9/2011 |
| KR | 10-1994-0004954 A | 6/1994 |
| KR | 10-1998-0033797 A | 8/1998 |
| KR | 10-1999-0043005 A | 6/1999 |
| KR | 20000008601 A | 2/2000 |
| KR | 101119718 B1 | 3/2012 |

OTHER PUBLICATIONS

Korean Office Action for related Korean application No. 10-2015-0109511; action dated Dec. 31, 2019; (5 pages).
Korean Notice of Allowance for related Korean Application No. 10-2015-0109511; action dated Jul. 15, 2019; (2 pages).

* cited by examiner

- Prior art -

- Prior art -

- Prior art -

- Prior art -

METHOD OF CONTROLLING ENCODER PRINCIPLE AXIS SPEED SYNCHRONIZATION

CROSS REFERENCE TO RELATED APPLICATIONS

This application claims the benefit of Korean Patent Application No. 10-2015-0109511, filed on Aug. 3, 2015 and entitled "METHOD OF CONTROLLING ENCODER PRINCIPLE AXIS SPEED SYNCHRONIZATION", which is hereby incorporated by reference in its entirety.

BACKGROUND

Technical Field

Embodiments of the present disclosure relate to a method of controlling an encoder principle axis speed synchronization.

Description of the Related Art

A position determination module among specific modules of a programmable logic controller (PLC) applied to a factory automation (FA) system and the like is for controlling a motor. That is, a major function of the position determination module is to output a pulse for activating a servo drive. In regard mechanical devices, which are applied to many systems, being activated by motors, the position determination module plays an important role in a PLC system.

An encoder principle axis speed synchronization among functions of the position determination module is a function for outputting the number of pulses using a principle axis ratio versus a minor ratio which are ratios set to a principle axis being a reference axis and a minor axis being a control target using the number of encoder pulse signals. That is, the encoder principle axis speed synchronization calculates the number of pulses to be output during a next control period using the number of encoder pulse signals during a control period on the basis of the principle axis ratio versus the minor ratio. For example, the encoder principle axis speed synchronization calculates the number of pulses to be output during a second duration 12 of FIG. 1 using the number of encoder pulse signals being input during a first duration 11 of FIG. 1.

A process of controlling an encoder principle axis speed synchronization of a position determination module will be described with reference to FIGS. 1 and 2. A position determination module operates with a constant control period. When a control period is commenced, the position determination module verifies whether or not the number of encoder pulse signals being input exists.

When the number of the encoder pulse signals being input during the control period is greater than 0 in Operation S21, the position determination module counts the encoder pulse signals being input at every control period to calculate the number of pulses to be output during a next control period in Operation S22.

For example, if the number of encoder pulse signals being input during the first duration 11 is 2 and the principle axis ratio versus the minor axis ratio is 2:2, the position determination module may calculate the number of pulses to be output during the second duration 12 as 4. As another example, if the number of encoder pulse signals being input during the second duration 12 is 5 and the principle axis ratio versus the minor axis ratio is 5:5, the number of pulses to be output during a third duration 13 may be calculated as 25.

The position determination module maps the calculated value to an output of a next control period in Operation S23, and waits for the remaining time of the control period in Operation S24.

On the other hand, when the number of the encoder pulse signals being input is equal to or less than 0 in Operation S21, the position determination module waits for the remaining time of the control period in Operation S24.

Also, the process of controlling the encoder principle axis speed synchronization measures an encoder input speed using the number of the encoder pulse signals being input during the control period of the position determination module, and determines the number of pulses to be output during a next control period using the encoder input speed.

With reference to FIG. 3, on the assumption that a control period is 1 milliseconds (ms) and a rising edge of an encoder pulse signal is counted, a process of measuring an encoder input speed will be described. Since the number of encoder pulse signals being input during a first duration 31 is 6, an encoder input speed is measured as 6 kHz, and a pulse corresponding to 6 kHz is output during a second duration 32. And, since the number of encoder pulse signals being input during the second duration 32 is 7, the encoder input speed is measured as 7 kHz, and a pulse corresponding to 7 kHz is output during a third duration 33.

In FIG. 3, an actual speed of the encoder pulse signal is constant, and the number of the encoder pulse signals being input during each of the first duration 31, the second duration 32, and the third duration 33 is different. Therefore, the encoder input speed at each of the first duration 31, the second duration 32, and the third duration 33 is differently measured.

However, if the number of encoder pulse signals being input is longer than a control period to exceed that control period, an encoder input speed is measured only during a control period to which a rising edge of the encoder pulse signal is input. Thus, the encoder input speed is not measured during the remaining control period to cause non-uniformity in the measured encoder input speed.

With reference to FIG. 4, when an encoder pulse signal is longer than a control period to exceed that control period, on the consumption that the control period is 1 ms and a rising edge of the encoder pulse signal is counted, a process of measuring an encoder input speed will be described.

Since the number of encoder pulse signals being input during a first duration 1 is 1, an encoder input speed is measured as 1 kHz, and a pulse corresponding to 1 kHz is output during a second duration 2.

However, since the number of the encoder pulse signals being input during a second duration 2 is 0, the encoder speed is measured as 0 kHz, and there is no pulse corresponding to 0 kHz so that a pulse is not output during a third duration 3.

As in the second duration 2, since the number of the encoder pulse signals being input during a third duration 3 to a tenth duration 10 is 0, the encoder input speed is measured as 0 kHz, and there is no pulse corresponding to 0 kHz so that a pulse is not output during a next duration.

Since the number of the encoder pulse signals being input during an eleventh duration 11 is 1, the encoder input speed is measured as 1 kHz, and a pulse corresponding to 1 kHz is output during a twelfth duration 12.

However, since the number of the encoder pulse signals being input during the twelfth duration 12 is 0, the encoder input speed is measured as 0 kHz, and there is no pulse corresponding to 0 kHz so that a pulse is not output during thirteenth duration 13.

As in the twelfth duration 12, since the number of the encoder pulse signals being input during the thirteenth duration 13 to a fifteenth duration 15 is 0, the encoder input speed is measured as 0 kHz, and there is no pulse corresponding to 0 kHz so that a pulse is not output during a next duration.

As described above, an outputting of the pulse having an inconstant encoder input speed by the position determination module upon controlling of an encoder principle speed synchronization means that a motor does not rotate constantly. That is, a pulse having a non-constant encoder input speed is output such that there is a problem in that a motor does not rotate smoothly.

SUMMARY

An object of some embodiments of the present disclosure is to provide a method of controlling an encoder principle axis speed synchronization capable of calculating an interval between encoder pulse signals using a count value at an input time of each of the encoder pulse signals to measure an encoder input speed according to the interval therebetween, thereby exactly measuring an encoder speed.

Also, another object of some embodiments of the present disclosure is to provide a method of controlling an encoder principle axis speed synchronization capable of generating an output pulse according to an encoder input speed to map the output pulse to an output of a next control period, thereby constantly maintaining the output pulse.

The problem(s) to be addressed by embodiments of the present disclosure are not limited to the described above, and other problem(s) not mentioned above will be apparently understood by those skilled in the art from the following disclosure.

Among embodiments, a method of controlling an encoder principle axis speed synchronization, which is executed in a microprocessor module, performs latching a count value at an input time of an encoder pulse signal to a specific memory when a control period is commenced and the encoder pulse signal is received, generating an output pulse using the count value latched to the specific memory, and mapping the output pulse to an output during a next control period.

The details of other embodiments are included in the detailed description and the accompanying drawings.

The advantages and features of the present disclosure described herein and methods for attaining them will become more apparent with reference to the accompanying drawings in association with embodiments described in detail. However, the present disclosure is not limited to some embodiments set forth herein and it will be implemented in different forms, but these embodiments are also the teachings of the present disclosure to those skilled in the art, will be provided to tell the full scope of the present disclosure, and the present disclosure will only be defined by the appended claims. Throughout the specification, the same reference numerals refer to like components. Throughout the present disclosure, the same drawing reference numerals should be understood to refer to the same component.

In accordance with some embodiments of the present disclosure, an object is to provide a method of controlling an encoder principle axis speed synchronization capable of calculating an interval between encoder pulse signals using a count value at an input time of each of the encoder pulse signals whenever the encoder pulse signals are input to measure an encoder input speed according to the interval therebetween, thereby exactly measuring an encoder speed.

Also, in accordance with some embodiments of the present disclosure, another object is to provide a method of controlling an encoder principle axis speed synchronization capable of generating an output pulse according to an encoder input speed to map the output pulse to an output of a next control period, thereby constantly maintaining the output pulse.

DETAILED DESCRIPTION

Hereinafter, embodiments of the present disclosure will be described in detail with reference to the accompanying drawings.

A "control period" of the terms used herein means a time for calculating encoder pulse signals which is to be output during a next control period. Such a control period may be different according to a manufacturer and a product and may be in the range of several hundreds microseconds (µs) to several tens milliseconds (ms).

For example, a control period of a system controlling a motor means a time between a first process of calculating encoder pulse signals to be output to the motor and the first process of applying the encoder pulse signals to the motor.

As described above, the control period means a time between the first processing and a second process, and encoder pulse signals, which are to be output during a next control period, are calculated for such a time.

Figure 1:
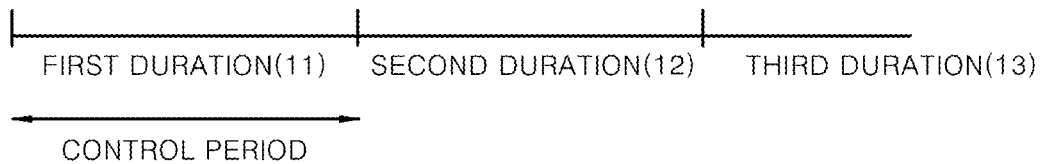
FIG. 1 is a diagram for describing a control period of a position determination module, according to the prior art.
Figure 2:
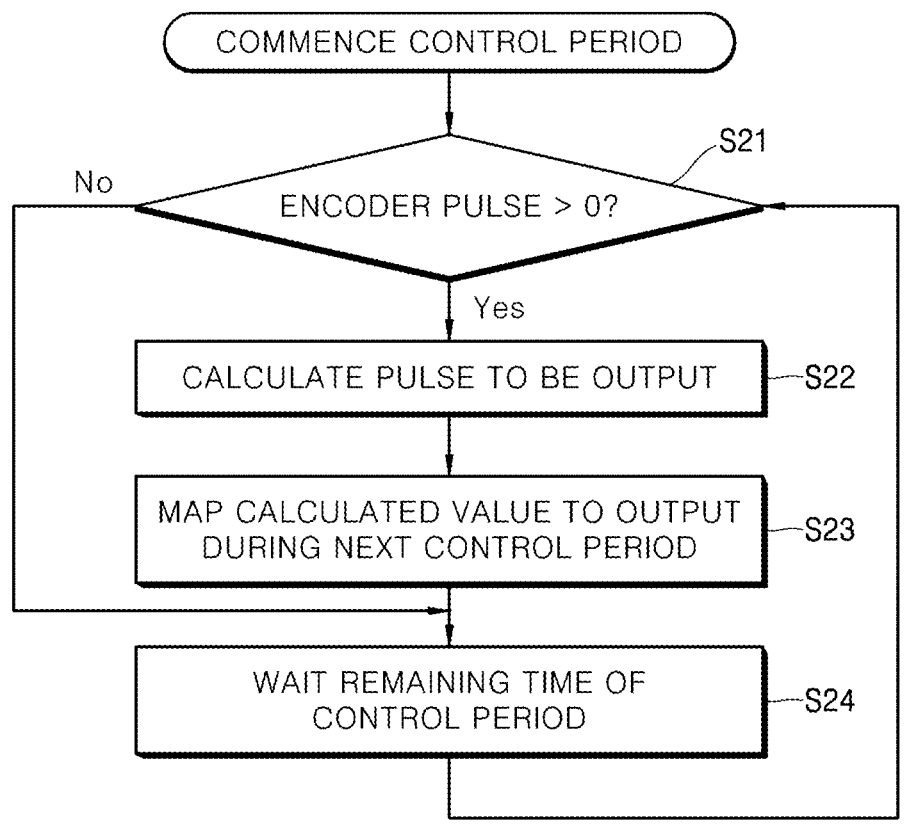
FIG. 2 is a flow chart for describing a process of controlling an encoder principle axis speed synchronization of the position determination module, according to the prior art.
Figure 3:
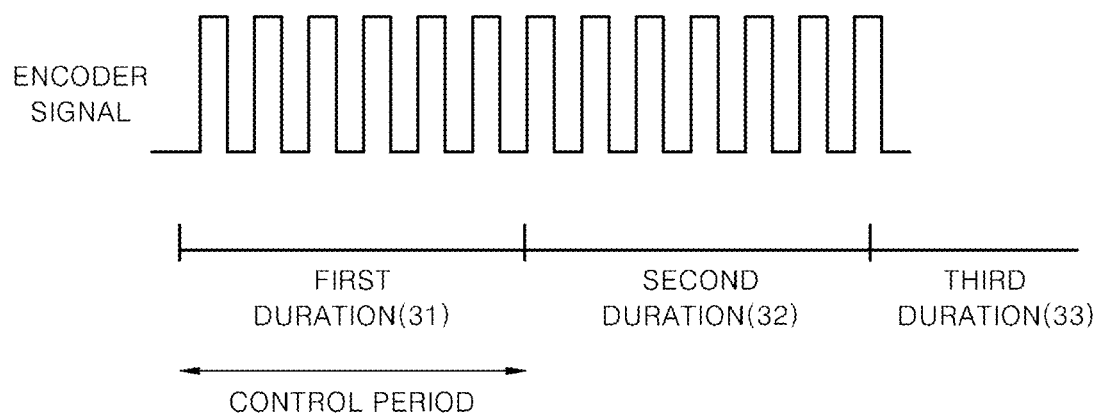
FIGS. 3 and 4 are diagrams for describing a process of measuring an encoder input speed, according to the prior art.
Figure 4:
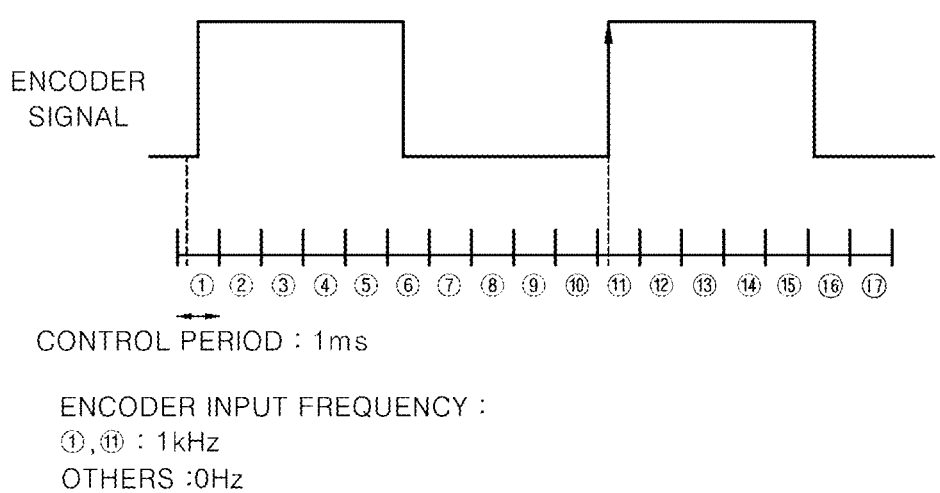
Figure 5:
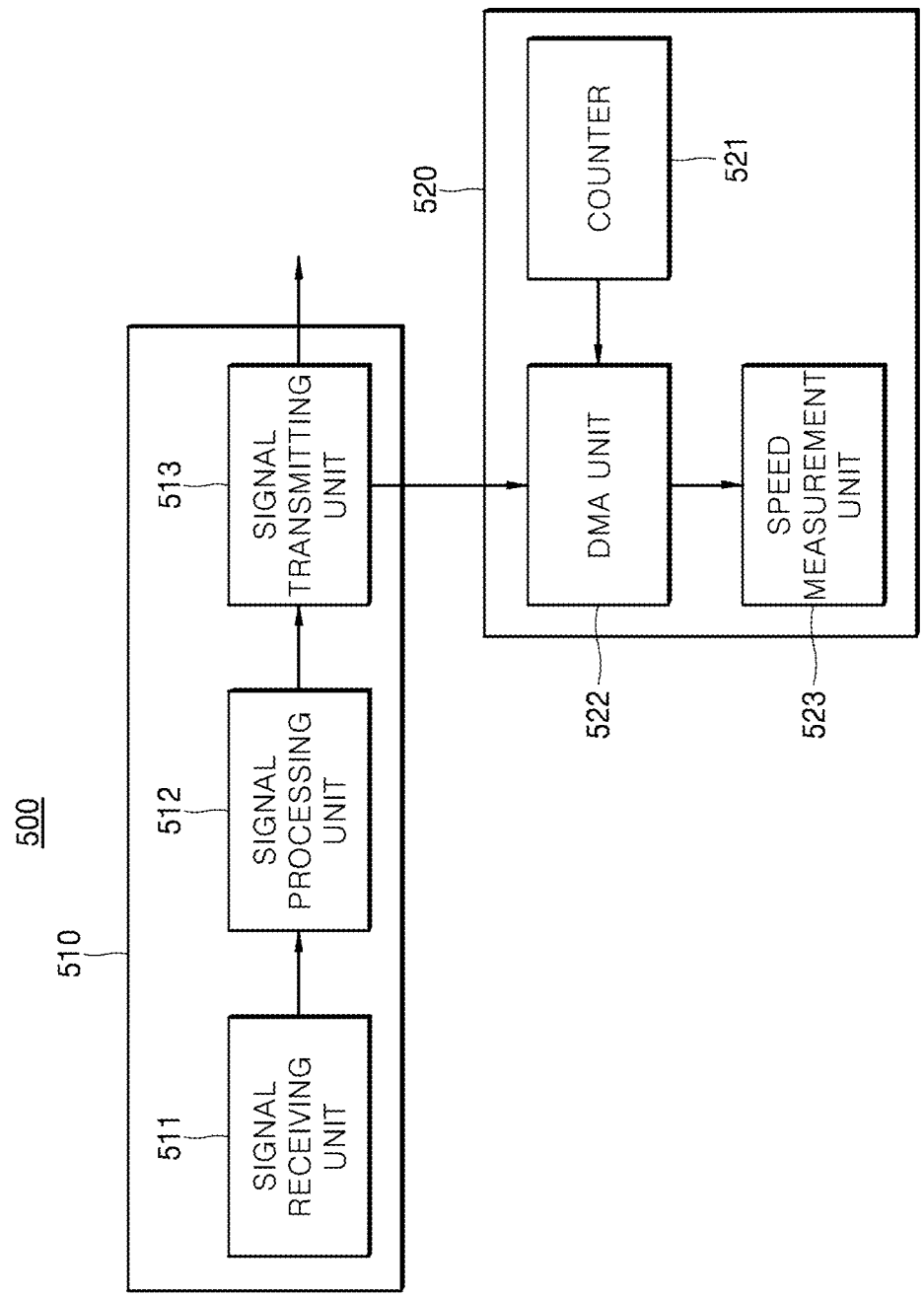
FIG. 5 is a block diagram for describing an encoder principle speed synchronization controller according to some embodiments of the present disclosure.

FIG. 5 is a block diagram for describing an encoder principle speed synchronization controller according to some embodiments of the present disclosure.

With reference to FIG. 5, an encoder principle speed synchronization controller 500 according to some embodiments of the present disclosure includes a signal provision module 510 and a microprocessor module 520.

The signal provision module 510 processes an encoder pulse signal to provide the processed signal as an external interrupt input signal of the microprocessor module 520.

Such a signal provision module 510 includes a signal receiving unit 511, a signal processing unit 512, and a signal transmitting unit 513.

The signal receiving unit 511 receives an encoder pulse signal from an encoder. Here, the encoder pulse signal includes a PULSE/DIR (pulse/direction) signal, a CW/CCW (clockwise/counterclockwise) signal, and a PHASE signal.

The signal processing unit 512 generates an external interrupt input signal using at least one among the PULSE/DIR signal, the CW/CCW signal, and the PHASE signal.

The PULSE/DIR signal includes a pulse signal representing an input pulse speed and a direction signal representing a rotational direction of the encoder.

The CW/CCW signal includes a forward direction pulse signal representing an input pulse speed while the encoder rotates in a forward direction, and a reverse direction pulse signal representing an input pulse speed while the encoder rotates in a reverse direction.

The PHASE signal includes a first signal and a second signal including phases different from each other. A phase difference exists between the first signal and the second signal, a phase difference represents an encoder forward direction when a phase of the first signal advances than that of the second signal, and otherwise, the phase difference represents an encoder reverse direction when the phase of the second signal advances than that of the first signal. The PHASE signal is generated in two pulses for a control period. Therefore, when an encoder pulse input mode is the PHASE signal, a frequency measurement may be possible the same as other signals if ½ of a frequency of an input encoder pulse is used.

The signal transmitting unit 513 provides the signal processed by the signal processing unit 512 as an external interrupt input signal of the microprocessor module 520.

The microprocessor module 520 includes a counter 521 capable of performing a count at a period which is desired by a user, and a direct memory access (DMA) unit 522 for latching a count value at an input time of an encoder pulse signal whenever the encoder pulse signal is input to a specific memory. Also, a speed measurement unit 523 is further included. The speed measurement unit 523 calculates an average interval of an encoder pulse signal using a count value at an input time of the encoder pulse signal, thereby measuring a speed of the encoder.

The counter 521 increases or decreases a count value of a specific memory at every predetermined period. At this point, the count value may be initialized to 0 at every control period to be synchronized with the control period.

The count value generated by the counter 510 may be used to calculate an interval between encoder pulse signals. As described above, the reason why the count value at an input time of the encoder pulse signal is latched to the specific memory is to calculate an interval between encoder pulse signals using an interval of the count value latched to the specific memory.

When the encoder pulse signal is input from the signal provision module 510, the DMA unit 522 latches the count value generated by the counter 521 to the specific memory. For example, when receiving a rising edge and a falling edge of an external interrupt, the DMA unit 522 may latch the count value generated by the counter 521 to the specific memory. The speed measurement unit 523 calculates an average interval of the encoder pulse signal using the counter value at the input time of the encoder pulse signal, thereby measuring an encoder speed.

In particular, the speed measurement unit 523 determines the number of the encoder pulse signals input during a control period according to latching times of the count value to the specific memory at the input time of the encoder pulse signal.

Thereafter, the speed measurement unit 523 may calculate an average interval between the encoder pulse signals using the count value latched to the memory at an input time of an encoder pulse signal with respect to each of the encoder pulse signals corresponding to the number of the encoder pulse signals. That is, the speed measurement unit 523 may calculate the average interval between the encoder pulse signals according to a variation of the count value latched to the memory at an input time of each of the encoder pulse signals.

As described above, the speed measurement unit 523 calculates the average interval between the encoder pulse signals to measure an encoder input speed, thereby providing an advantage in that an encoder speed may be exactly measured.

Figure 6:
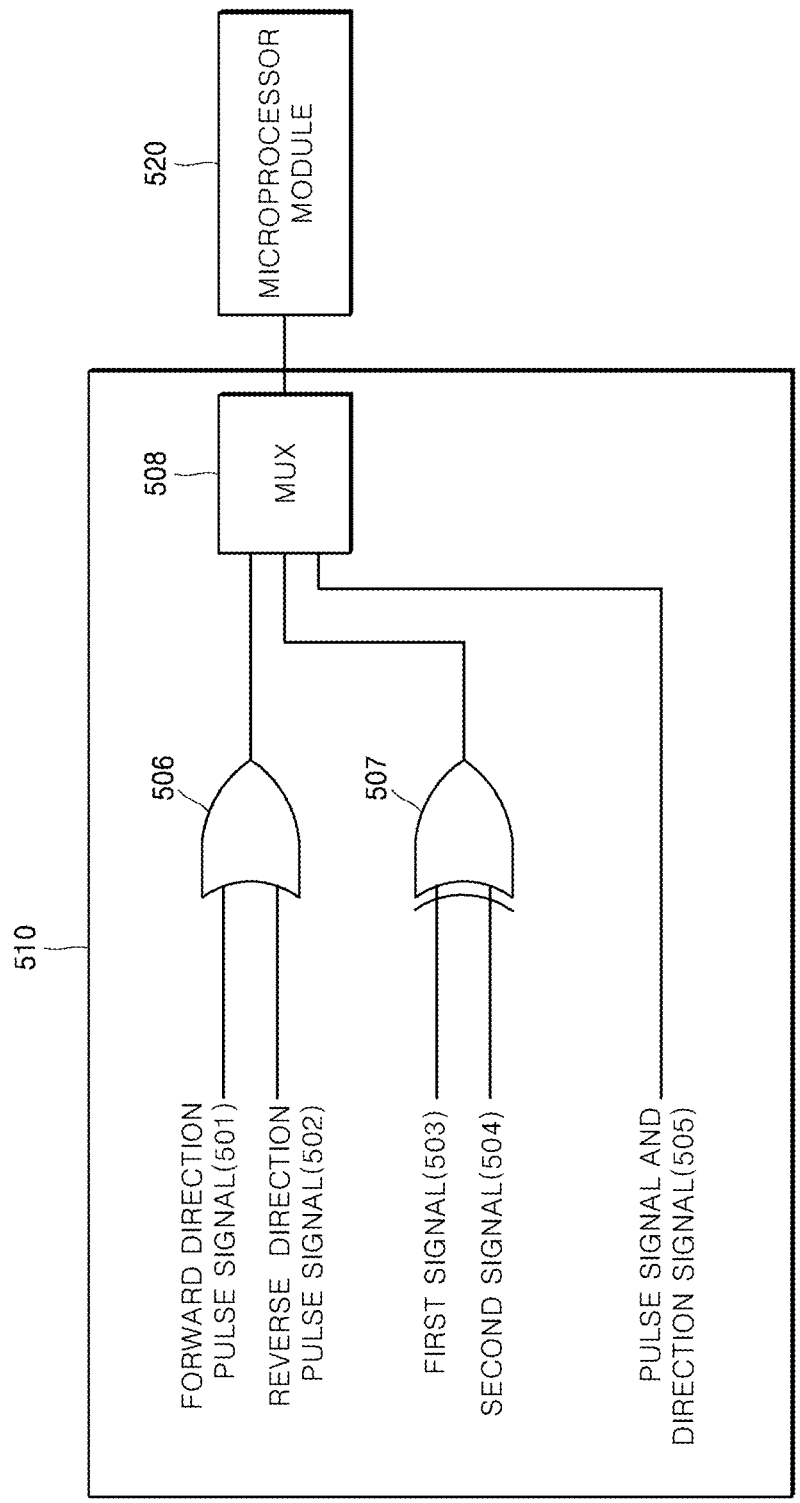
FIGS. 6 to 8 are circuit diagrams for describing the encoder principle speed synchronization controller according to some embodiments of the present disclosure.
Figure 7:
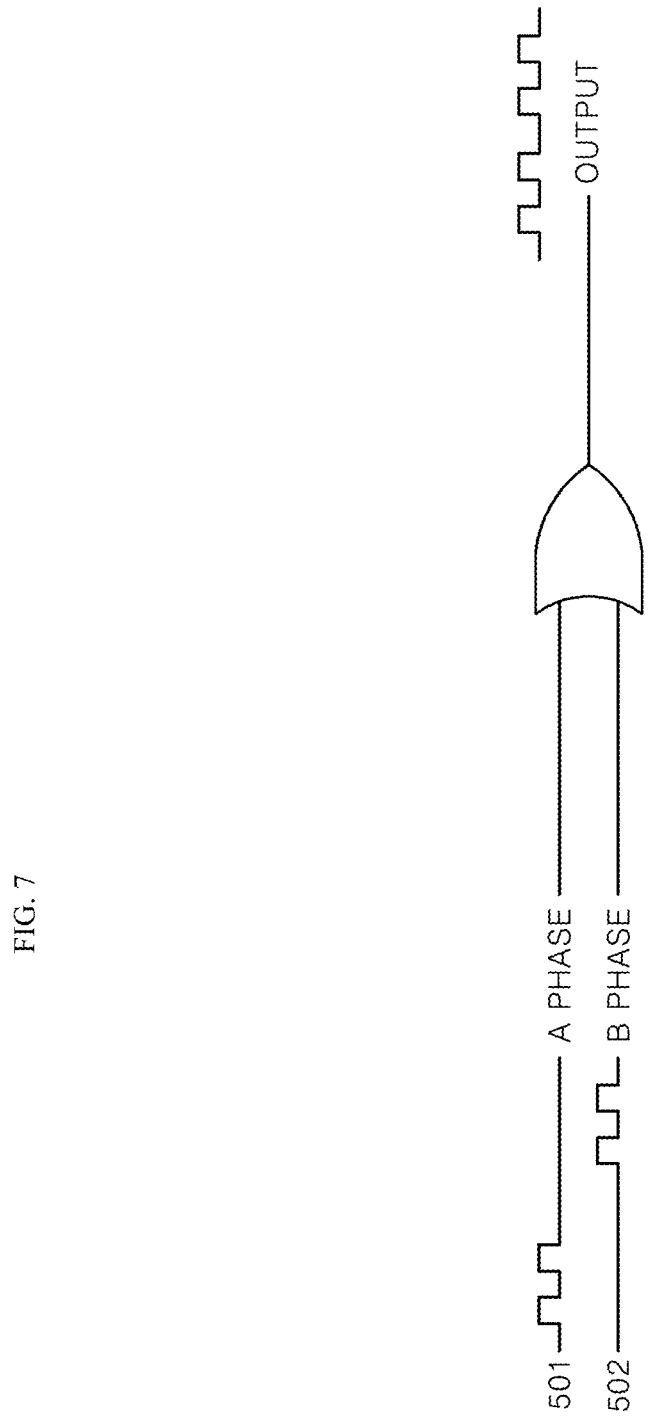
Figure 8:
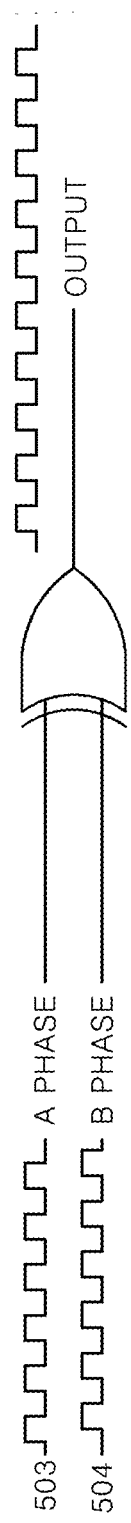

FIGS. 6 to 8 are circuit diagrams for describing an encoder principle axis speed synchronization controller according to some embodiments of the present disclosure.

With reference to FIGS. 6 to 8, the signal provision module 510 may generates a signal provided as an external interrupt input signal to the microprocessor module 520 using a PULSE/DIR signal, a CW/CCW signal, and a PHASE signal.

The CW/CCW signal includes a forward direction pulse signal 501 representing an input pulse speed while the encoder moves in a forward direction, and a reverse direction pulse signal 502 representing an input pulse speed while the encoder moves in a reverse direction. And, the forward direction pulse signal 501 and the reverse direction pulse signal 502 are used as inputs of an OR gate 506. An output signal of the OR gate 506 is used as an input of a MUX 508. For example, as shown in FIG. 7, the forward direction pulse signal 501 and the reverse direction pulse signal 502 may be used as the inputs of the OR gate 506, and the OR gate 506 may perform an OR operation on the forward direction pulse signal 501 and the reverse direction pulse signal 502 to output a signal.

The PHASE signal includes a first signal 503 and a second signal 504 including phases different from each other, and the first signal 503 and the second signal 504 are used as inputs of an XOR gate 507. An output signal of the XOR gate 507 is used as an input of the MUX 508. For example, as shown in FIG. 8, the first signal 503 and the second signal 504 may be used as the inputs of the XOR gate 507, and the XOR gate 507 may perform an XOR operation on the first signal 503 and the second 504 to output a signal.

The PULSE/DIR signal includes a pulse signal representing an input pulse speed and a direction signal representing a rotational direction of the encoder, and the pulse signal and the direction signal are used as inputs of the MUX 508. Specifically, in some embodiments of the present disclosure, only the pulse signal representing an input pulse speed may be used as an input of the MUX 508.

The MUX 508 outputs and provides one among the output signal of the OR gate 506, the output signal of the XOR gate 507, and the PULSE/DIR signal as an interrupt input signal to the microprocessor module 520.

Figure 9:
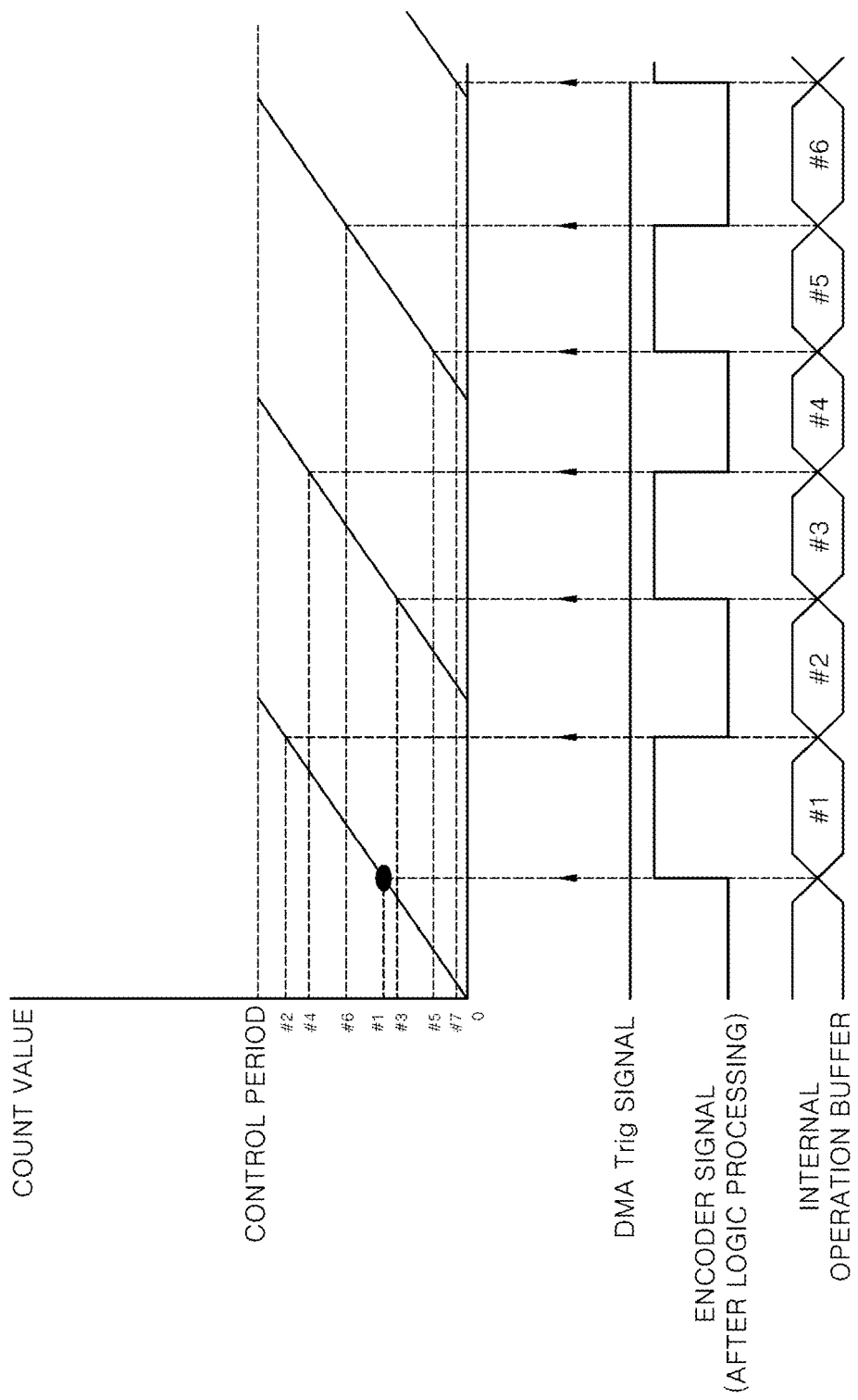
FIG. 9 is a diagram for describing a running process of a microprocessor module of FIG. 5, according to some embodiments of the present disclosure.

FIG. 9 is a diagram for describing a running process of the microprocessor module of FIG. 5.

When receiving an external interrupt input signal from the signal provision module 510, the microprocessor module 520 uses the external interrupt input signal as a trigger signal. There is a limitation on a high speed pulse to copy a count value to a desired memory in a software method whenever an external interrupt input signal is received. Therefore, the microprocessor module 520 may latch a count value to a specific memory in a hardware method. The count value may be initialized at every control period to be synchronized with a control period, thereby measuring an input speed of the encoder.

Figure 10:
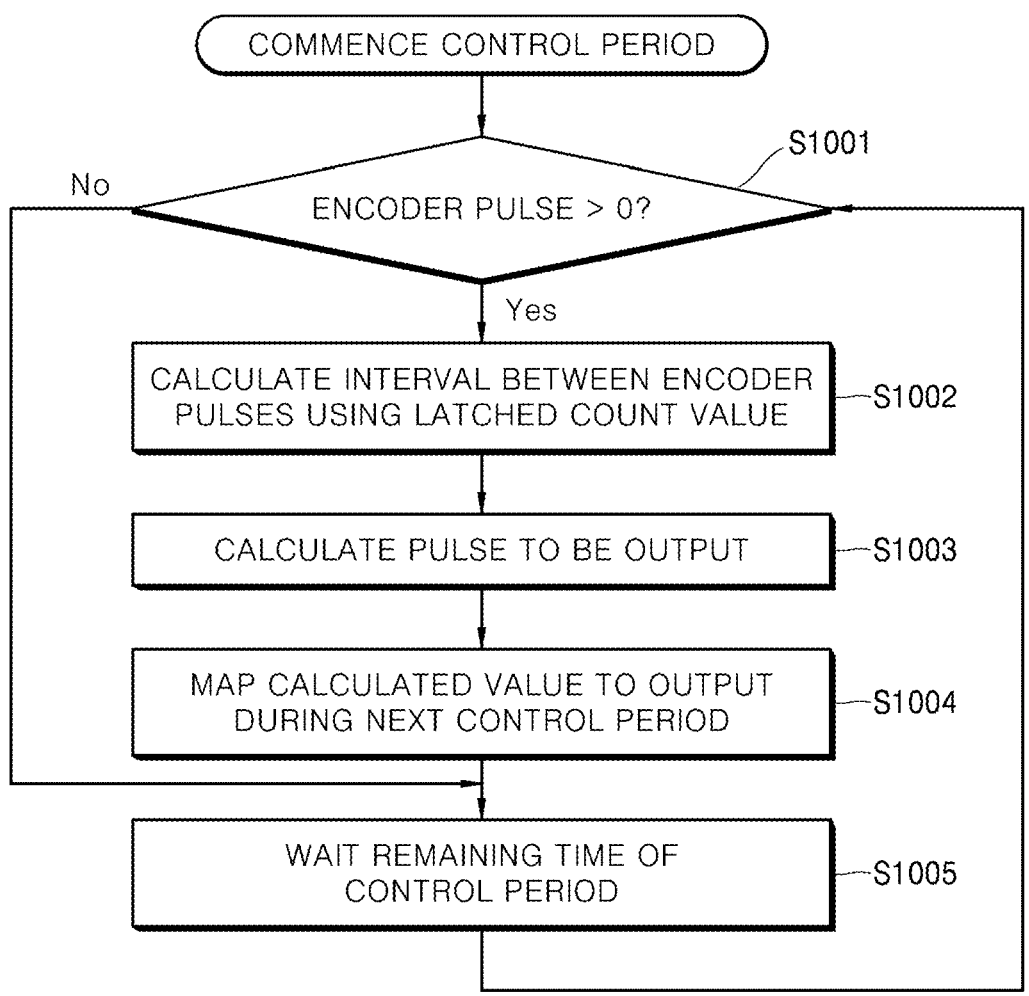
FIG. 10 is a flow chart for describing a method of measuring an encoder principle axis speed according to some embodiments of the present disclosure.

FIG. 10 is a flow chart for describing a method of measuring an encoder principle axis speed according to the present disclosure.

With reference to FIG. 10, when a control period is commenced, the microprocessor module 520 verifies whether or not the number of encoder pulse signals being input exists in Operation S1001. When the number of the encoder pulse signals being input during the control period is greater than 0, the microprocessor module 520 calculates an interval between the encoder pulse signals in Operation S1002.

In particular, the microprocessor module 520 determines the number of the encoder pulse signals being input during the control period according to times of a count value latched to a specific memory at an input time of the encoder pulse signal. Thereafter, the microprocessor module 520 may calculate an average interval between the encoder pulse signals using the count value latched to the memory at the input time of the encoder pulse signal with respect to each of the encoder pulse signals corresponding to the number thereof.

That is, the microprocessor module 520 may calculate the average interval between the encoder pulse signals according to a variation of the count value latched to the memory at the input time of each of the encoder pulse signals.

The microprocessor module 520 generates a pulse to be mapped to an output of a next period using the average interval between the encoder pulse signals being received during the control period. The microprocessor module 520 maps the generated pulse to an output of a next control period in Operation S1004, and waits for the remaining time of the control period in Operation S1005. On the other hand, when the number of the encoder pulse signals being input is equal to or less than 0 in Operation S1001, the microprocessor module 520 waits for the remaining time of the control period in Operation S1005.

Figure 11:
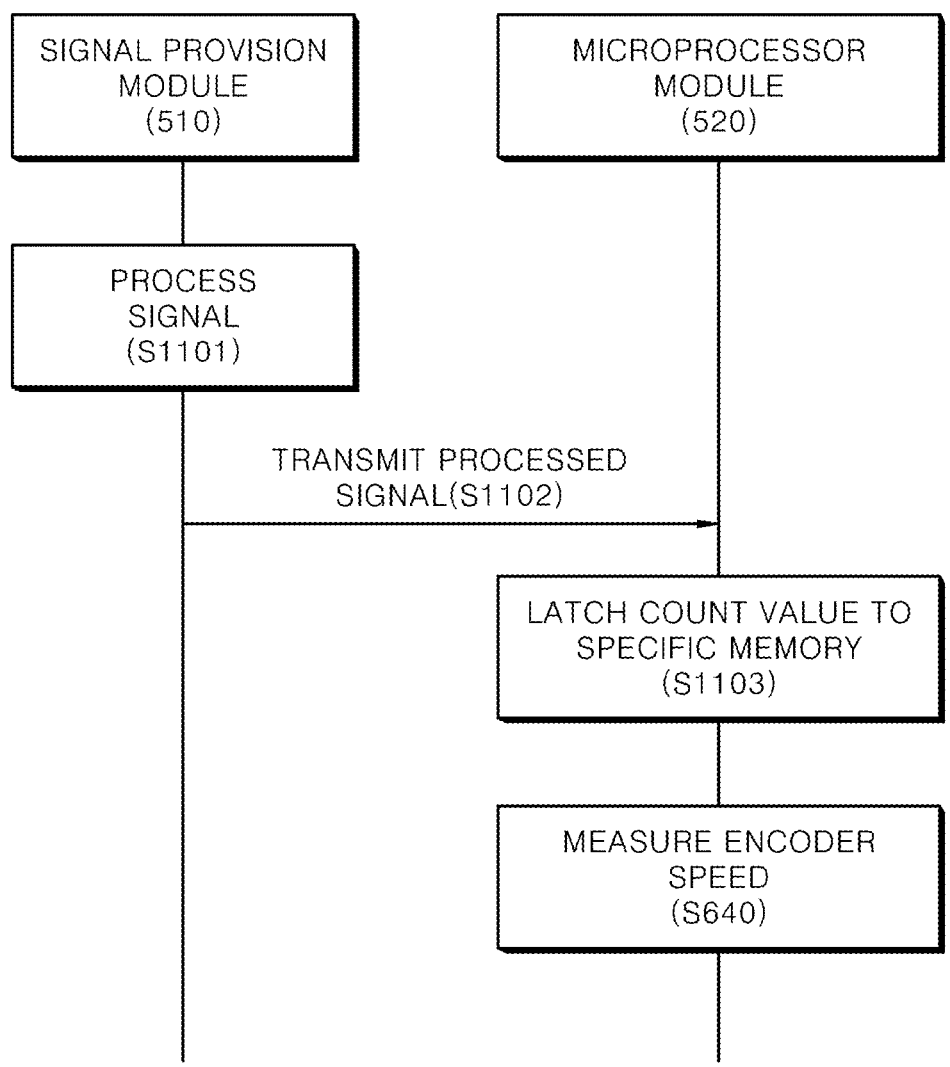
FIG. 11 is a flow chart for describing some embodiments of a method of controlling an encoder principle axis speed synchronization according to some embodiments of the present disclosure.

FIG. 11 is a flow chart for describing some embodiments of a method of controlling an encoder principle axis speed synchronization according to the present disclosure.

With reference to FIG. 11, the signal provision module 510 processes multiple encoder pulse signals in Operation S1101.

In some embodiments for Operation S1101, the signal provision module 510 may generate an encoder pulse signal using at least one among a PULSE/DIR signal, a CW/CCW signal, and a PHASE signal.

In particular, the signal provision module 510 performs an OR operation on the CW/CCW signal and an XOR operation on the PHASE signal. Thereafter, a signal being output as a result of the OR operation, a signal being output as a result of the XOR operation, and the PULSE/DIR signal may be passed the MUX to generate the encoder pulse signal.

The signal provision module 510 provides the processed encoder pulse signal as an external interrupt input signal of the microprocessor module 520 in Operation S1102.

When receiving the encoder pulse signal, the microprocessor module 520 latches a count value at an input time of the encoder pulse signal to a specific memory in Operation S1103. As described above, the reason why the count value at the input time of the encoder pulse signal is latched to the specific memory is to calculate an interval between the encoder pulse signals using the count value latched to the specific memory.

The microprocessor module 520 calculates an interval between the encoder pulse signals based on the latched count value to measure an encoder input speed in Operation S1104.

In particular, the microprocessor module 520 determines the number of the encoder pulse signals being input during the control period according to latching times of the count value to the specific memory at the input time of the encoder pulse signal.

Thereafter, the microprocessor module 520 may calculate an average interval between the encoder pulse signals using the count value latched to the memory at the input time of the encoder pulse signal with respect to each of the encoder pulse signals corresponding to the number thereof.

That is, the microprocessor module 520 may calculate the average interval between the encoder pulse signals according to a variation of each of the count values latched to the memory at the input time of each of the encoder pulse signals.

As described above, the microprocessor module 520 may calculate the average interval between the encoder pulse signals to measure an encoder input speed, thereby providing an advantage in that an encoder speed may be exactly measured.

Heretofore, although concrete embodiments according to the present disclosure have been described, it should be understood that numerous other modifications can be implemented without departing from the scope of this disclosure. Therefore, the scope of the present disclosure should not be limited to some embodiments described above, and it should be defined by the appended claims to be described later and also equivalents thereof.

In accordance with some embodiments of the present disclosure, it is an object to provide a method of controlling an encoder principle axis speed synchronization capable of calculating an interval between encoder pulse signals using a count value at an input time of an encoder pulse signal and measuring an encoder input speed according to the interval therebetween, thereby exactly measuring an encoder speed.

Also, in accordance with some embodiments of the present disclosure, it is an object to provide a method of controlling an encoder principle axis speed synchronization capable of generating an output pulse according to an encoder input speed to map the output pulse to an output of a next control period, thereby constantly maintaining the output pulse.

As described above, although the present disclosure has been described in conjunction with the illustrative embodiments and drawings, but it is not limited thereto, and it should be understood that various alterations and modifications can be devised by those skilled in the art from the disclosure herein. Therefore, the spirit of the present disclosure should be construed by the appended claims to be described later and equivalents thereof and equivalent modifications should be included in the spirit of the disclosure. The accompanying claims and their equivalents are intended to cover such forms or modifications as would fall within the scope and spirit of the protection. Various components illustrated in the figures may be implemented as hardware and/or software and/or firmware on a processor, ASIC/FPGA, dedicated hardware, and/or logic circuitry. Also, the features and attributes of the specific embodiments disclosed above may be combined in different ways to form additional embodiments, all of which fall within the scope of the present disclosure. Although the present disclosure provides certain preferred embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

What is claimed is:

1. A method of controlling an encoder principle axis speed synchronization executed by a microprocessor, the method comprising:
   initializing a count value when a control period is commenced in order to synchronize the count value with the control period, wherein the control period is a time for calculating encoder pulse signals to be output during a next control period, and wherein an encoder pulse signal is longer than the control period;
   increasing or decreasing the count value at every specific period;
   latching the count value corresponding to an input time of the encoder pulse signal to a memory and calculating an interval between encoder pulse signals using the count value latched at the input time of each of the encoder pulse signals when the encoder pulse signal is received for the control period;
   generating an output pulse using the interval between the encoder pulse signals being input during the control period according to latching times of the count value to the memory at the input time of each of the encoder pulse signals; and
   mapping the output pulse to an output during a next control period of the motor.

2. The method of claim 1, wherein generating of the output pulse using the count value latched to the memory includes calculating an average interval between the encoder pulse signals using the count value latched to the memory at the input time of each of the encoder pulse signals with respect to the number of the encoder pulse signals.

3. The method of claim 1, wherein the encoder pulse signal is generated through at least one of: a PULSE/DIR (pulse/direction) signal, a CW/CCW (clockwise/counter-clockwise) signal, or a PHASE signal according to an encoder input mode to be used as an external interrupt signal of the microprocessor.

4. The method of claim 3, wherein the CW/CCW signal includes a forward direction pulse signal and a reverse direction pulse signal, the PHASE signal includes a first signal and a second signal which includes phases different from each other, and the PULSE/DIR signal includes a pulse signal representing an input pulse speed and a direction signal representing a rotational direction of an encoder.

5. The method of claim 4, wherein the encoder pulse signal includes at least one of: a signal being output as a result of an OR operation on the forward direction pulse signal and the reverse direction pulse signal, a signal being output as a result of an XOR operation on the first signal and the second signal, or the PULSE/DIR signal.

* * * * *